3,071,594
THIOPHOSPHORIC ACID ESTERS AND PROCESSES
FOR THEIR PRODUCTION
Edgar Enders, Leverkusen, and Günter Unterstenhöfer, Opladen, Germany, assignors to Farbenfabriken Bayer Aktiengesellschaft, Leverkusen, Germany, a corporation of Germany
No Drawing. Filed July 19, 1961, Ser. No. 125,078
Claims priority, application Germany July 23, 1960
10 Claims. (Cl. 260—327)

The present invention relates to and has as its objects new and useful thiophosphoric acid esters with insecticidal properties and processes for the preparation thereof. The new compounds of this invention may be represented by the following general formula

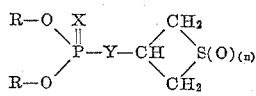

in which X and Y are oxygen or sulfur at least one of them being sulfur, R stands for a lower alkyl radical especially up to 4 carbon atoms and $n$ is a whole number up to 2 or zero.

These compounds may be obtained by methods known in principle. Thus, O.O-dialklythiophosphoric acid halides may be reacted with 3-hydroxy-trimethylene-sulfide (sulfoxide or sulfon) in the presence of an inert (organic) solvent:

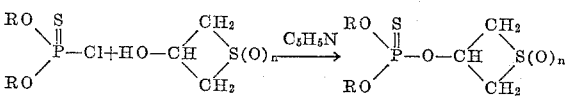

The symbols in these formulae have the above given significance. Suitable thiophosphoric acid ester halides are chlorides or bromides of O.O-dimethyl-, diethyl-, diisopropyl-, O-methyl-O-ethyl-, the O.O-cyclodimethylene-thiophosphoric acid and the like. Acid-binding agents are especially those which simultaneously can act as solvents such as pyridine, dimethylaniline, triethylamine, dimethylbenzylamine and the like. Further inert solvents are e.g. alcohols, ketones, benzene and the like. Other acid-binding agents suitable for the inventive reactions are potassium or sodium carbonates or hydroxides or alcoholates, magnesium oxide, zincoxide and the like.

The inventive esters of the aforeshown type alternatively can be prepared by reacting the above mentioned 3-hydroxy-trimethylene-sulfide (sulfon, sulfoxide) with suitable O.O-dialkylphosphorus acid halides and subsequently reacting the phosphites obtained, with sulfur.

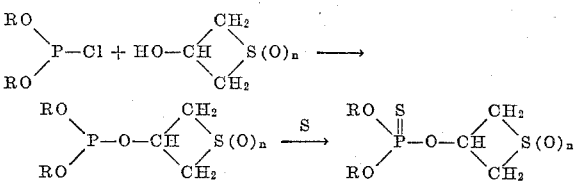

The symbols again have the above given significance.

Thiol- and thionothiolphosphoric acid esters of the inventive type are obtained by reacting suitable salts of O.O-dialkyl-thiol (or thionothiol) phosphoric acids with trimethylene-sulfides (sulfoxides or sulfons) having in 3-position an anionic reactive group. Such compounds e.g. are the 3-chloro- or 3-benzene or -toluene sulfonyl-hydroxy-trimethylene sulfide (sulfoxide or sulfon) this reaction may be shown in the following equation:

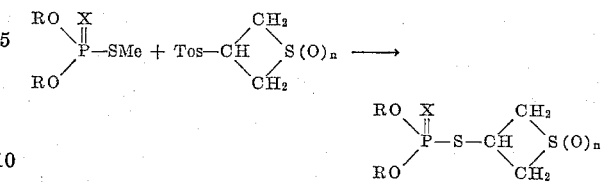

X in these formulae is the same as said above, also R and $n$ have the above given significance. Me stands for a salt forming radical such as an alkali metal, an ammonium group and the like, and Tos stands for the p-toluene-sulfonyl-hydroxy group.

Also this reaction suitably is carried out in the presence of inert organic solvents.

At last the inventive sulfoxido or sulfono compounds may be prepared by oxidizing the corresponding sulfido compounds by conventional methods. Thus, with potassium permanganate there are obtained sulfons and with hydrogen peroxide (in glacial acetic acid) there are obtained sulfoxides:

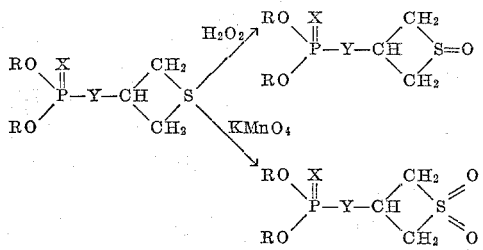

X, Y and R are the same as said above.

The new compounds of the present invention very effectively kill insects like flies, mites, aphids, etc. They distinguish themselves especially by a good contact-insecticidal activity and at the same time by an activity on eating insects such as caterpillars. The compounds may be used in the same manner as other known phosphoric acid insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be used water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula

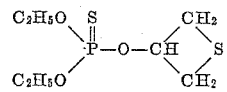

has been tested against caterpillars, flies and aphids. Aqueous concentrations of the aforementioned compound have been prepared by admixing them with the same amount of an auxiliary solvent (acetone). A commercial emulsifier (benzyl hydroxy diphenyl polyglycol ether)

is added in an amount of 20% referred to active ingredient. This premixture then is diluted with water to the desired concentration. The tests have been carried out as follows:

(a) Against caterpillars: White cabbage has been sprayed drip wet with aqueous emulsions as prepared above in the concentration as indicated below. Caterpillars (Plutella maculipennis), 10 each, have been placed on the sprayed leaves of the white cabbage; the living status of the caterpillars has been determined after 24 hours and 48 hours. The results have been obtained as follows: caterpillars were killed completely with 0.002% solutions.

(b) Against flies (Drosophila): About 50 flies are placed under covered Petri dishes in which drip wet filter paper has been placed which were sprayed with an insecticidal solution of a concentration as shown below. The living status of the flies has been determined after 24 hours. The following results have been obtained: flies were killed completely with 0.002% solutions.

(c) Against aphids (Mycus persicae): Heavily infested bean plants (Vicia faba) have been sprayed drip wet with solutions as prepared above. The effect has been determined by evaluation after 24 hours by counting the dead pests either on the surface of the soil or still remaining on the plants. The following results have been obtained: aphids were killed completely with 0.02% solutions.

The following examples are given to illustrate the present invention.

*Example 1*

$$\begin{array}{c} C_2H_5O \\ \phantom{xx} \diagdown \phantom{xx} \parallel^S \\ \phantom{xxxxxx} P-O-CH \\ \phantom{xx} \diagup \\ C_2H_5O \end{array} \begin{array}{c} CH_2 \\ \diagup \phantom{xx} \diagdown \\ \phantom{xxx} S \\ \diagdown \phantom{xx} \diagup \\ CH_2 \end{array}$$

To a solution of 30 parts by weight of 3-hydroxy-trimethylene sulfide in 40 parts by volume of pyridine and 40 parts by volume of chloroformic acid there are added dropwise at 5–10° C. 64 parts by weight of diethyl-thionophosphoric acid chloride. This mixture is stirred for 2 hours at 20° C. and poured into ice-water and diluted hydrochloric acid. Thereafter there are further added 200 parts by volume of benzene, the organic layer is separated, washed with water and dried over calcium chloride. The thiophosphoric acid ester obtained is purified by fractionated distillation. B.P. 125–135° C./0.6 mm. Hg; $n_D^{20.4}$: 1.5080.

Analysis.—$C_7H_{15}O_3S_2P$ [242.3].—Calculated: S, 26.4%; P, 12.8%. Found: S, 25.3%; P, 13.55%.

Caterpillars and flies are killed completely with 0.002% solutions. Aphids are killed completely with 0.02% solutions. Spider mites are killed completely with 0.2% solutions (resistant). Systemic action on aphids (Doralis fabae) with 0.0008% solutions=90%.

By oxidizing the above ester with about the calculated amount (small excess) of potassium permanganate in aqueous solutions in the presence of a small amount of acetone at low temperatures (about 5° C.) there is obtained the corresponding sulfon $$\begin{array}{c} C_2H_5O \\ \diagdown \parallel^S \\ \phantom{xxx} P-O-C \\ \diagup \\ C_2H_5O \end{array} \begin{array}{c} CH_2 \\ \diagup \phantom{xx} \diagdown \\ \phantom{xxx} S \\ \diagdown \phantom{xx} \diagup \\ CH_2 \end{array} \begin{array}{c} O \\ \diagup \\ \diagdown \\ O \end{array}$$

With hydrogen peroxide in glacial acetic acid at about room temperature there is obtained the corresponding sulfoxide $$\begin{array}{c} C_2H_5O \\ \diagdown \parallel^S \\ \phantom{xxx} P-O-CH \\ \diagup \\ C_2H_5O \end{array} \begin{array}{c} CH_2 \\ \diagup \phantom{xx} \diagdown \\ \phantom{xxx} S=O \\ \diagdown \phantom{xx} \diagup \\ CH_2 \end{array}$$

*Example 2*

$$\begin{array}{c} CH_3O \\ \diagdown \parallel^S \\ \phantom{xxx} P-O-CH \\ \diagup \\ CH_3O \end{array} \begin{array}{c} CH_2 \\ \diagup \phantom{xx} \diagdown \\ \phantom{xxx} S \\ \diagdown \phantom{xx} \diagup \\ CH_2 \end{array}$$

To a solution of 30 parts by weight of 3-hydroxy-trimethylene sulfide in 40 parts by volume of pyridine and 40 parts by volume of chloroformic acid there are added dropwise at 5–10° C. 55 parts by weight of dimethyl-thionophosphoric acid chloride. This mixture is stirred for 2 hours at 20° C. and then worked up as described in Example 1. The compound is decomposed at temperatures above 100° C. For purposes of analysis solvents were separated in high vacuum at 90° C.

Analysis.—$C_5H_{11}O_3S_2P$ [214.24].—Calculated: P, 14.45%. Found: P, 14.6%.

Caterpillars are killed completely with 0.002% solutions. Flies are killed completely with 0.02% solutions. Aphids are killed to 95% with 0.02% solutions. Spider mites are killed to 50 with 0.2% solutions (resistant). Systemic action with 0.004% solutions=100%.

*Example 3*

$$\begin{array}{c} C_2H_5O \\ \diagdown \parallel^S \\ \phantom{xxx} P-S-CH \\ \diagup \\ C_2H_5O \end{array} \begin{array}{c} CH_2 \\ \diagup \phantom{xx} \diagdown \\ \phantom{xxx} S \\ \diagdown \phantom{xx} \diagup \\ CH_2 \end{array}$$

To a solution of 23 parts by weight of the potassium salt of O.O-diethyl-dithiophosphoric acid ester in 200 parts by volume of acetone there are added 22 parts by weight of the potassium salt of 3-hydroxy-trimethylene sulfide-O-sulfonic acid and this mixture is heated under reflux. Thereafter the solvent is distilled off, the residue is mixed with water and the benzene is extracted. The benzenic solution is dried over calcium chloride and concentrated in vacuum. The remaining oily O.O-diethyl-S-(3-thia-cyclobutyl)-dithiophosphoric acid ester is freed from volatile ingredients in high vacuum at 80° C.

Caterpillars are killed completely with 0.1% solutions. Flies and aphids are killed completely with 0.01% solutions. Spider mites are killed completely with 0.01% solutions (resistant). Systemic action with 0.1% solutions=100%.

By the same way, with O.O-diethyl-thiolphosphoric acid potassium salt there is obtained in an analogous manner the following compound $$\begin{array}{c} C_2H_5O \\ \diagdown \parallel^O \\ \phantom{xxx} P-S-CH \\ \diagup \\ C_2H_5O \end{array} \begin{array}{c} CH_2 \\ \diagup \phantom{xx} \diagdown \\ \phantom{xxx} S \\ \diagdown \phantom{xx} \diagup \\ CH_2 \end{array}$$

*Example 4*

$$\begin{array}{c} C_2H_5O \\ \diagdown \parallel^O \\ \phantom{xxx} P-O-CH \\ \diagup \\ C_2H_5O \end{array} \begin{array}{c} CH_2 \\ \diagup \phantom{xx} \diagdown \\ \phantom{xxx} S \\ \diagdown \phantom{xx} \diagup \\ CH_2 \end{array}$$

To a solution of 30 parts by weight of 3-hydroxy-trimethylene sulfide in 40 parts by volume of pyridine and 60 parts by volume of toluene there are added dropwise 47 parts by weight of phosphoric acid diethylester-monochloride in 100 parts by volume of toluene at a temperature of 15–20° C. while passing over nitrogen. After finishing of the reaction there are added in several proportions at a temperature of 30° C. 9.6 parts by weight of sulfur and this mixture at last is warmed for 15 minutes to 70° C. After cooling down the mixture is poured into ice-water and diluted hydrochloric acid, the organic layer is washed twice with water, dried over calcium chloride and the toluene is distilled off in vacuum. There is obtained as an oily residue the O.O-diethyl-O-(3-thiacyclobutyl)-thiophosphoric acid ester.

We claim:

1. A compound of the formula $$\begin{array}{c} R-O \\ \diagdown \parallel^X \\ \phantom{xxx} P-Y-CH \\ \diagup \\ R-O \end{array} \begin{array}{c} CH_2 \\ \diagup \phantom{xx} \diagdown \\ \phantom{xxx} S(O)_{(n)} \\ \diagdown \phantom{xx} \diagup \\ CH_2 \end{array}$$

in which R stands for alkyl of 1 to 4 carbon atoms, X and Y are members selected from the group consisting of oxygen and sulfur, one of them being sulfur, and n stands for a number selected from the group consisting of zero, one and two.

2. The compound of the following formula

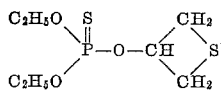

3. The compound of the following formula

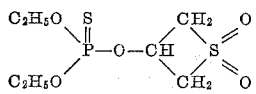

4. The compound of the following formula

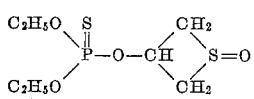

5. The compound of the following formula

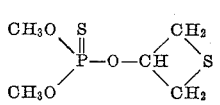

6. The compound of the following formula

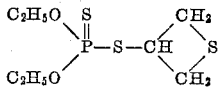

7. The compound of the following formula

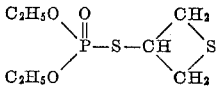

8. A compound of claim 1 wherein X is sulfur and Y is oxygen.

9. A compound of claim 1 wherein X and Y are each sulfur.

10. A compound of claim 1 wherein X is oxygen and Y is sulfur.

References Cited in the file of this patent

UNITED STATES PATENTS

| | | |
|---|---|---|
| 2,882,278 | McConnell et al. | Apr. 14, 1959 |
| 2,939,871 | Pyne et al. | June 7, 1960 |

FOREIGN PATENTS

| | | |
|---|---|---|
| 1,082,915 | Germany | June 9, 1960 |